United States Patent
Bowern et al.

(10) Patent No.: US 8,346,075 B2
(45) Date of Patent: Jan. 1, 2013

(54) SATELLITE POSITIONING FOR CAMERAS

(75) Inventors: John Bowern, Crawley (GB); Stuart Butterfield, Appleford-on-thames (GB); Paul Gough, Horley (GB); Saul Dooley, Reigate (GB)

(73) Assignee: U-Blox A.G., Thalwil (CH)

( * ) Notice: Subject to any disclaimer, the term of this patent is extended or adjusted under 35 U.S.C. 154(b) by 0 days.

(21) Appl. No.: 13/056,110

(22) PCT Filed: Jul. 27, 2009

(86) PCT No.: PCT/GB2009/050922
§ 371 (c)(1),
(2), (4) Date: Jan. 26, 2011

(87) PCT Pub. No.: WO2010/013034
PCT Pub. Date: Feb. 4, 2010

(65) Prior Publication Data
US 2011/0123187 A1   May 26, 2011

(30) Foreign Application Priority Data
Jul. 28, 2008 (GB) .................................... 0813751.5

(51) Int. Cl.
*G03B 17/24* (2006.01)
(52) U.S. Cl. ........................................................ 396/310
(58) Field of Classification Search .................. 396/310; 342/357.74, 357.77
See application file for complete search history.

(56) References Cited

U.S. PATENT DOCUMENTS

| | | | |
|---|---|---|---|
| 5,768,640 A | 6/1998 | Takahashi et al. | |
| 6,437,797 B1 | 8/2002 | Ota | |
| 6,700,388 B1 * | 3/2004 | Mayor et al. | 324/537 |
| 6,995,792 B1 | 2/2006 | Ogura | |
| 7,222,033 B1 * | 5/2007 | Newson et al. | 702/65 |
| 2005/0275726 A1 | 12/2005 | Abraham et al. | |
| 2007/0126627 A1 | 6/2007 | Ueno et al. | |
| 2007/0200862 A1 | 8/2007 | Uchiyama et al. | |

* cited by examiner

*Primary Examiner* — Clayton E Laballe
*Assistant Examiner* — Linda B Smith
(74) *Attorney, Agent, or Firm* — Blakely, Sokoloff, Taylor & Zafman (57) ABSTRACT

A method of receiving satellite signals for estimating the location of capture of a photograph by a camera. The method comprises receiving a signal relating to the timing of capture of the photograph; waiting for an interval of non-zero duration; and, after the interval, receiving the satellite signals.

14 Claims, 5 Drawing Sheets

SATELLITE POSITIONING FOR CAMERAS

This is a non-provisional application claiming the benefit of International application number PCT/GB2009/050922 filed, Jul. 27, 2009.

This invention relates to satellite positioning systems. In particular, it relates to "geo-tagging" of photographs (recording the location of capture of the image) using a satellite positioning receiver.

Geo-tagging is an increasingly popular way to annotate and organize images and videos. By adding location metadata to the media, users can search and browse an image collection in interesting and intuitive ways—for example by plotting the locations on a map.

To avoid the labour-intensive task of manually typing the location names or geographic coordinates necessary to create such annotations, many camera users are turning to satellite positioning to provide precise location metadata.

Satellite positioning systems, such as the Global Positioning System (GPS), enable a receiver to calculate its position based on the measured time of arrival of signals from a set of orbiting satellites.

It is known to integrate a GPS receiver in a digital camera. With this arrangement, the receiver estimates a position fix each time a photo is taken. The resulting estimate is typically added to the image file—for example as part of the Exchangeable Image File (Exif) metadata.

However, a problem with this arrangement is that the electronics in the camera subsystem can cause electromagnetic (EM) interference which disrupts the clear reception of signals from the satellites by the GPS receiver. The noise created by the camera electronics may make the position fix more difficult or impossible to achieve, or it may simply decrease the accuracy of the result.

According to an aspect of the current invention, there is provided a method of receiving satellite signals for estimating the location of capture of a first photograph by a camera, the method comprising: receiving a signal relating to the timing of capture of the first photograph; waiting for an interval of non-zero duration; and, after the interval, receiving the satellite signals.

By introducing a delay or offset greater than zero between the taking of a picture and the sampling of GPS signals to determine position, the method reduces the interference by the camera electronics with GPS reception. The method relies on the availability of just a single trigger signal, relating to the timing of capture of the photograph—for example the pressing of the "shutter release" button. The delay accounts for the duration of the period in which the camera is producing EM interference. Thus, no additional signal (for example, to indicate image capture is complete) is necessary from the camera. This allows the GPS and camera subsystems to be simple and modular in design, by minimizing the complexity of interconnections or communications interfaces between them.

In some embodiments, the duration of the interval comprises a predetermined delay.

Preferably, the duration is manually adjustable.

This ensures flexibility. Manual configuration of the delay means the GPS receiver can be customized depending on the circumstances in which it is used. For an external GPS receiver, the manual adjustment may be by a user. For an integrated GPS receiver, the customization may be carried out in the factory when a camera is assembled using a third-party GPS receiver.

The duration may be determined based upon parameters of the camera.

Different cameras produce different amounts of interference and do so for different durations after the shutter has been released. In order to minimise the timing delay of GPS reception for every camera, it may be advantageous to select or calculate the delay based on camera parameters such as make, model, capture mode or more detailed information.

The duration may be automatically determined based on parameters received from the camera.

If the camera is capable of transmitting information about itself, the customization of the GPS timing delay can be achieved automatically. This avoids the need (by way of example) for manual customization or user input of the camera model parameters into a GPS receiver. It can also allow more refined adjustment of the delay, based on the camera parameters associated with an individual photograph. For example, the camera mode (flash/no flash; compressed/uncompressed file; resolution, among others) may have an impact on the duration and quantity of noise generated during capture.

The method may further comprise measuring electromagnetic interference associated with the capture of a photograph, wherein the duration of the interval is determined based upon the measured interference.

As an alternative, or in addition to, the camera transmitting its parameters, the actual interference generated by a particular camera can be measured and analysed to deduce a suitable delay-duration. This direct measurement can avoid inaccurate predictions or the need to maintain a database relating camera model parameters to interference periods and appropriate delays.

Note that the duration determined by measuring the interference could be used to set the delay for the current photograph, or it may be used to set the delay for subsequent photographs. The first alternative involves dynamically setting the delay-duration for each photo, such that the system adapts to the prevailing interference conditions in "real-time". The second alternative allows for "offline" analysis, if necessary—that is, the delay-duration determined from one photograph is used to set the delay for other later photographs. Thus, the photograph used in measuring the interference may be the same as, or different from, the photograph with which the delay is then applied.

The step of measuring the electromagnetic interference may comprise one or both of: performing a Fourier transform on a sequence of received IF signal samples; and mixing a sequence of received IF signal samples with generated signal samples at a frequency of interest.

The duration of the interval may be determined by repeatedly or continuously measuring the level of interference, wherein the interval ends as soon as the measured level of interference falls below a threshold.

This threshold may be chosen based on a previously measured level of interference corresponding to the capture of at least one earlier photograph.

The duration may be chosen such that the step of receiving the satellite signals is executed as soon as possible after the expected subsidence of electromagnetic interference associated with the capture of the photograph.

It is beneficial to keep the delay as brief as possible in all cases. The longer the delay after image capture the greater the error in the location estimate (since the camera may have moved from the position in which the photograph was taken). Also, there is a risk that the camera will have been put away (for example in a pocket, bag or car) and so it will be more difficult to receive satellite signals. By way of example, the delay may be between 0.1 s and 10 s, more preferably between 0.5 s and 5 s.

The step of receiving the satellite signals may be repeated a predetermined number of times.

This increases the chances of at least one successful position fix.

The method may further comprise: during the interval receiving a further signal relating to the timing of the capture of an additional photograph; and in response, adjusting the duration of the interval.

If another photograph is taken shortly after the first, there may be little or no break in the EM interference from the camera electronics. The reception of GPS signals should therefore be rescheduled. For example a timer controlling the delay could be reset.

The adjustment of the duration may comprise extending the duration of the interval by a predetermined amount.

The delay necessary to avoid interference may be cumulative as the number of photos captured increases. Simply restarting a timer (for example) upon the subsequent shutter release may therefore not be sufficient to reduce the interference.

The method may further comprise storing the received satellite signals in a memory so as to enable later processing to estimate the location of capture.

Storage of the samples is an alternative to immediate (real-time) processing to derive a position fix. This "capture and process later" approach allows the GPS receiver to be simplified and also to consume less power. Since the delayed capture of satellite signal samples gives increased confidence that a position fix will be possible, the invention makes it safer to store the samples without having fully processed them. In other words, the invention has particular benefits for a capture and process later GPS receiver, because this type of receiver is otherwise unaware of interference at the time of capture. For a real-time GPS receiver, the cost of interference may be the extra power consumed by a repeated attempt to receive satellite signals and compute a position fix. For a capture-and-process receiver, however, the interference may destroy the ability to compute a position fix at all. According to another aspect of the invention there is provided a method of configuring a satellite signal receiver apparatus comprising: receiving parameters of a camera with which the receiver apparatus is associated; automatically determining based upon the received parameters the duration of a period of electromagnetic interference associated with capture of a photograph by the camera; and transmitting the determined duration to the receiver apparatus.

This is a method of automatically configuring the delay duration in the previous method above. Camera parameters are received automatically and the corresponding correct delay is downloaded automatically to the GPS receiver device. This allows configuration of an optimal delay without any user interaction. This method can also be an alternative to automatic self-calibration by the receiver when it is connected to a camera (described above). Compared to that approach, this method can remove a burden on the receiver device to store a database of delays and camera parameters.

According to yet another aspect of the invention there is provided a satellite signal receiver apparatus adapted to perform one of the methods described earlier above, the apparatus comprising: receiving means, for receiving the signal relating to the timing of capture of the photograph; and receiving means, for receiving the satellite signals.

The invention will now be described by way of example, with reference to the accompanying drawings, in which.

A GPS receiver can be combined with a camera to enable photos to be tagged with location metadata corresponding to the place at which the image was taken. This combination can be achieved by integrating a GPS subsystem internally in a camera, or by connecting an external GPS device to a conventional camera. The latter connection could be by means of the camera hot-shoe, which is traditionally used to connect devices such as an external flash. The conventional hot-shoe therefore already provides a trigger signal corresponding to the shutter release (to allow flash synchronisation). The very same trigger signal can be used to trigger a GPS receiver to tag a position.

The GPS receiver can be a standard "real-time" GPS or of the recently developed capture-and-process-later (hereinafter "capture and process") type. This latter type of GPS separates the operations of receiving a GPS signal and processing it to derive position. The basic approach is to capture a short (for example 200 ms) burst of unprocessed GPS Intermediate Frequency (IF) data at the time a photo is taken. The processing is carried out later and may be on a separate device (for example, a personal computer, after upload of the photos and samples). It is therefore particularly important in a capture and process scenario to guarantee the integrity of the captured signal samples as far as possible—if the captured signals are corrupted or absent, then there will be no opportunity to re-capture good signals (as would be the case for real-time GPS).

The current inventors have discovered that while a capture triggered by the shutter release often works very well, some modern cameras generate a lot of electromagnetic interference at the time a picture is taken. This interference is then received by the GPS antenna (and/or the GPS RF circuitry) and reduces the quality of the recorded raw IF data; in some cases the interference is sufficient to make it impossible to obtain a position fix, or worse, to detect any GPS signals at all.

It is possible to use well known RF design techniques to make the GPS module more immune to interference; however, total isolation is impossible since the module must still be able to receive the desired GPS signals. Equally, one could redesign the camera to emit less interference, but that is often out of the control of the GPS manufacturer and/or would have a major impact on the camera design (making it larger or increasing cost).

The current invention provides a better way of reducing the interference from camera electronics. The idea is to delay the capture of the GPS IF data after the photo is taken so that the capture takes place as soon as possible after the interference caused by the camera's electronics has died down to an acceptable level. The taking of the photo is indicated by the pressing of the shutter-release button. In some embodiments, the delay may comprise, or consist exclusively of, a programmable delay that is predetermined before taking of the photo.

Adding a delay may diminish the accuracy of the resulting position fix as the user may move between taking the photo and the capture taking place. Also there is a risk that the camera may be "put away" between the photo and the capture, reducing the quality of the GPS signals recorded (either due to rapid acceleration during the capture or due to obscuration of the antenna). Therefore, keeping the delay to a minimum is desirable. Experiments have shown that with many captures a delay of only 1 s is sufficient but, importantly, the optimum delay will vary from camera to camera. Furthermore, the majority of interference has been found to be due to data transfer, whose duration and speed depends on various parameters of the camera in addition to the type/model. These include whether the user is shooting compressed (JPEG) or uncompressed (RAW) images; what resolution has been selected; whether internal or external memory is being used; the type of memory (for example, Compact Flash versus Secure Digital) and its write speed; and how many pictures are in the "transient" memory.

The advantage of the delayed capture approach is that damage to the quality of the recorded signals can be minimised and the likelihood of providing a sufficiently accurate position can be maximised. At the same time, interaction between the camera and the GPS receiver is simplified as there is no need to signal to the GPS that the noise-generating (that is interference-generating) activities of the camera electronics have finished.

Figure 1:
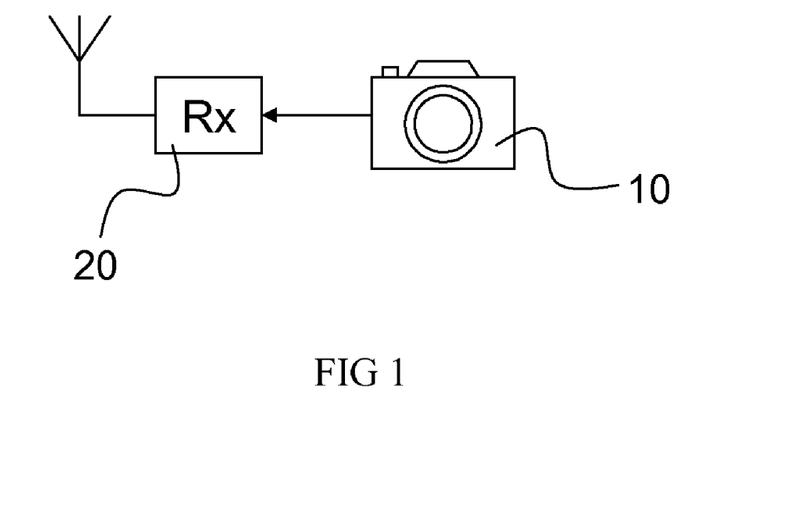
FIG. 1 is a diagram of a GPS receiver and camera operating according to an embodiment of the invention.

FIG. 1 shows a system operating according to one embodiment of a method of the invention. A camera 10 is connected to a GPS receiver 20. The connection allows the receiver 20 to be triggered to receive (capture) GPS signal samples in response to a shutter-release action on the camera. If the GPS receiver 20 is a real-time receiver, then a position fix is calculated immediately after the samples are received. If it is a capture and process receiver, then the samples are stored. The receiver 20 may be embedded (integrated) in the camera housing or may be a separate external device connected to the camera 10 by means of a communications link. One candidate for this link is connection via the camera hot-shoe; however, more advanced connections, such as wireless connection via Bluetooth, are also possible.

Figure 2:
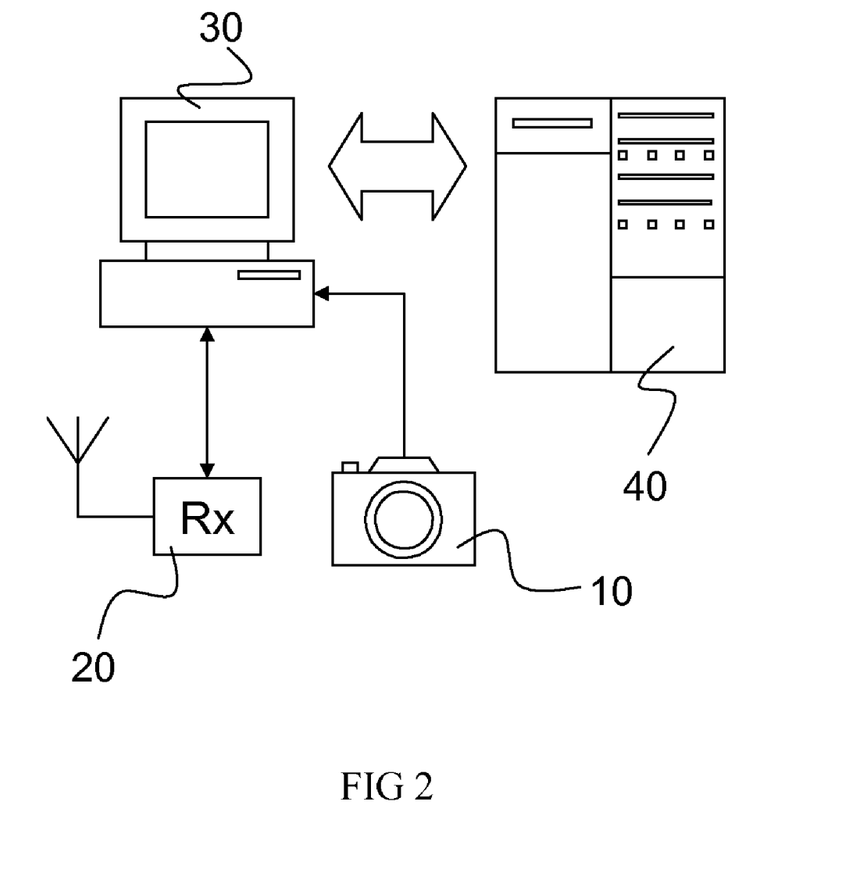
FIG. 2 shows how a GPS receiver can be configured according to an embodiment of the invention.

FIG. 2 shows the GPS receiver 20 being configured with the correct delay for a given camera 10. The camera 10 is connected to a personal computer (PC) 30, for example by a Universal Serial Bus (USB) link. The receiver 20 is also connected by some suitable connection. The PC 30 may interrogate the camera 10, which in any case provides parameter information to the PC. This may include the model and make of the camera, or more detailed information about its image capture specifications. Based on this information, the PC 30 calculates or selects the optimum delay which should be used by the receiver 20 when capturing GPS samples after a shutter-release event. This delay is then downloaded to the PC 30. In order to calculate the delay, the receiver 20 may contact a central database server 40 which maintains a list of camera models and corresponding optimal delay data.

The configuration of the receiver 20 may be carried out using a PC 30, when the receiver is to be used with a camera 10 for the first time. This will be the case if the receiver 20 is an external accessory. In this case the configuration can be fully automatic. For example, when a receiver accessory is connected to the PC at the same time as a camera with which it has not previously been used, software could ask the user if the receiver 20 is to be configured for use with the camera 10. If so, the software will automatically determine the necessary camera parameters to deduce or look up the proper delay value.

On the other hand, if the receiver is integrated in a camera, the configuration step will typically be carried out in the factory, when the camera is being assembled. This means that the camera manufacturer can purchase a generic GPS receiver and customise it appropriately for the parameters of its own camera. In this case, the receiver 20 can obviously be customized directly—there is no need to look up parameter information related to the camera, since this will be known to the manufacturer already.

Figure 3:
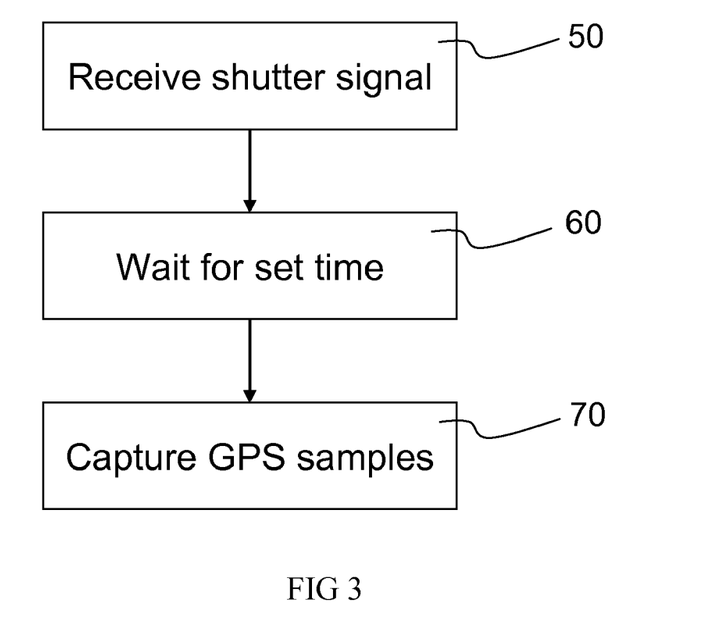
FIG. 3 is a flowchart showing a method of receiving satellite signals according to an embodiment of the invention.

FIG. 3 illustrates an example of the method steps carried out by the receiver 20 when in use. At step 50, a shutter-release signal is received or detected from the camera. This indicates that a photo is being captured. At step 60, the receiver pauses for the pre-programmed delay to allow time for the capture. The delay should also include time for the data transfer activity associated with storing the image file to the camera's memory. When the preset time has elapsed, the receiver captures GPS signals, free from interference from the camera electronics.

It is of course possible that the camera takes a number of photos in quick succession and that subsequent photos have been taken before the completion of the delay started by the first photo (that is, before the capture of GPS signals associated with the first photo). In such circumstances, making a capture at a rigidly fixed delay after each photo is unlikely to be successful (because the early captures will contain significant interference due to the camera still being active as it takes the subsequent photos). Several approaches can be adopted to manage this:

In a first approach, notification (shutter-trigger) of subsequent photos merely causes the delay countdown to be restarted. This will result in a single capture taking place with the usual programmed delay after the final photo of the sequence. For example, if the delay is set at 2s and photos are taken at times t, t+0.5s and t+1.5s, then the capture will take place at t+1.5+2s=t+3.5s.

In a second alternative approach, a single capture is taken after the last photo in the sequence, but the delay timer is increased for each new photo taken. This would work well if (as is the case for some cameras) the interference is principally caused by data transfer and so each photo taken creates a certain additional amount of work for the camera to do. The result is that the delay is calculated from the initial photo, but grows every time another photo is taken. For example, if the delay is set at 2 s and photos are taken at times t, t+0.5 s and t+1.5 s, then the capture will take place at t+3*2 s=t+6 s.

In a third approach the programming of the delay involves explicit setting of different delays for rapid sequences of photos (by the user or via a data base).

More sophisticated approaches to calculating the delay in the case of multiple image captures are also possible—including, but not limited to, combinations of the above rules.

In another variant of the invention, multiple captures (at different delays) are made for each photo taken. In circumstances where the interference is variable or unpredictable, having several captures may improve the likelihood of providing a sufficiently accurate position—even if one capture is badly damaged a second may not be. In addition, different captures could use different settings of the RF front-end (such as changing the frequency plan and/or altering filter parameters).

Figure 4:
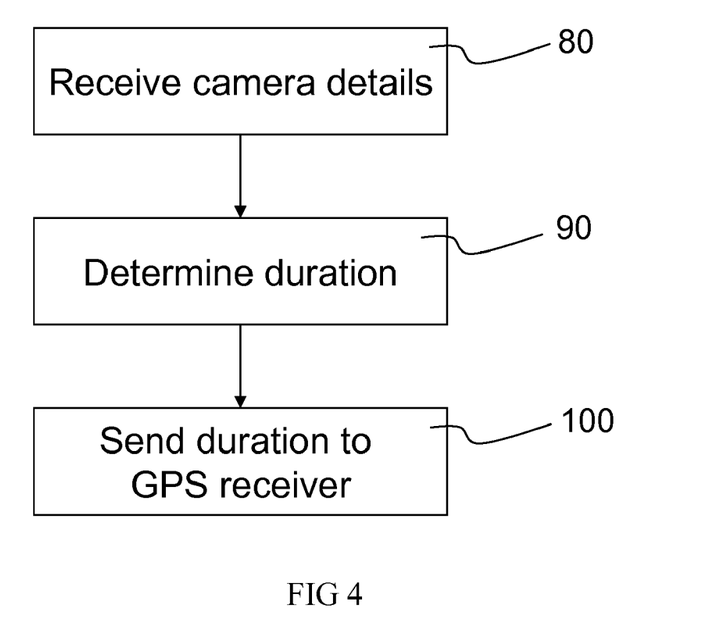
FIG. 4 is a flowchart of a method of configuring a satellite signal receiver according to an embodiment of another aspect.

FIG. 4 illustrates a configuration method according to an embodiment of an aspect of the invention. At step 80, camera parameters are received (for example, by a PC 30). The correct duration of the GPS delay is determined at step 90 and this information is downloaded to the GPS receiver in step 100.

Many variations are possible on this basic process. The PC 30 may not be necessary, if the GPS receiver 20 has a communications interface directly with the camera 10. In this case, the receiver 20 may receive parameters directly from the camera, compute the optimal delay duration itself and then use it when a photograph is next taken. One advantage of this direct communication from camera 10 to GPS receiver 20 is that parameters can be delivered more often—for example when the user of the camera selects a different mode. As noted above, the interference generated by the camera depends on factors such as image resolution and whether JPEG or RAW files are being stored. If the receiver 20 can obtain this information, the delay can be optimised to a greater degree. Another example of optimisation based on photographic parameters is adaptation of the delay depending on the orientation (that is, between portrait and landscape modes). A fixed GPS antenna in a camera is likely to receive satellite signals less effectively in the "wrong" orientation; thus, when a portrait photo is taken, it may be beneficial to have a longer delay, to allow time for the camera to be returned to its normal (landscape) orientation before attempting to receive signals.

Naturally, such arrangements require a more sophisticated interface between camera and receiver than would otherwise be used (in the simple case, the only signal is the shutter/trigger). However, for an internal GPS, there will be at least some flexibility in the definition of the interface with the camera electronics. Even for an external GPS accessory, sufficiently advanced interfaces already exist. These include wireless connections such as Bluetooth and wired connections such as intelligent hot-shoes, which have already been designed to pass camera parameters to external flash devices.

If the PC 30 and/or server 40 are eliminated from the configuration method, it may be necessary to store a database of cameras in the memory of the GPS receiver. This will enable the correct duration to be determined for a given camera make and model when it is connected. The storage of even a small list of cameras and durations would enable a GPS accessory to be used with different cameras without the need for the user to manually reconfigure it.

Any database, whether stored in a GPS receiver or on a PC, may be incomplete or contain out of date information. In a receiver accessory it may also introduce an unwanted memory burden. As an alternative, therefore, the current invention also provides for direct measurements of interference to be used to derive the delay duration. In this variation on the configuration method, the GPS receiver conducts an experiment to determine the interference associated with photo-capture. For example, the receiver may receive a relatively long, continuous stream of GPS signal data while a "test" photo is being taken; this data can then be processed to assess the duration and severity of interference from the camera electronics. The processing could be carried out in the GPS receiver, or (especially in the case of a capture and process accessory) on a PC, after upload. In any case, once the interference observed in the experiment has been analysed, an appropriate delay-duration can be set for subsequent photos. The experiment could be carried out upon first use of the GPS receiver or each time a new camera is used/detected.

Although it is beneficial to automate the customisation of the GPS receiver as far as possible, there may also be circumstances where a manual "override" is required. It is therefore preferably possible to adjust the duration of the capture-delay manually. This will allow the user to program a GPS receiver when an unfamiliar camera (that is, one not listed in the usual database) is connected. It will also allow adjustment of the delay depending on the mode of capture of photos, even when an interface is not available from camera to receiver to communicate the mode information. Direct, manual configuration will also be advantageous for a camera manufacturer embedding a standard GPS receiver in a large number of cameras.

In the embodiments described above, the duration of the delay is determined before the photo is captured (that is, before receipt of the shutter-release signal). In this case, the duration of the delay is predetermined with respect to the capture of the photograph. In other embodiments, however, it is possible to dynamically adapt the duration to the prevailing conditions, after the photo has been taken. Thus, the delay may include, or may consist exclusively of, a variable-duration delay that is determined based on the interference actually detected after a given photo has been taken. In this case, the duration of the delay is still predetermined with respect to the receipt of the satellite positioning signals, but is no longer predetermined with respect to the shutter-release or capture of the photograph.

Figure 5:
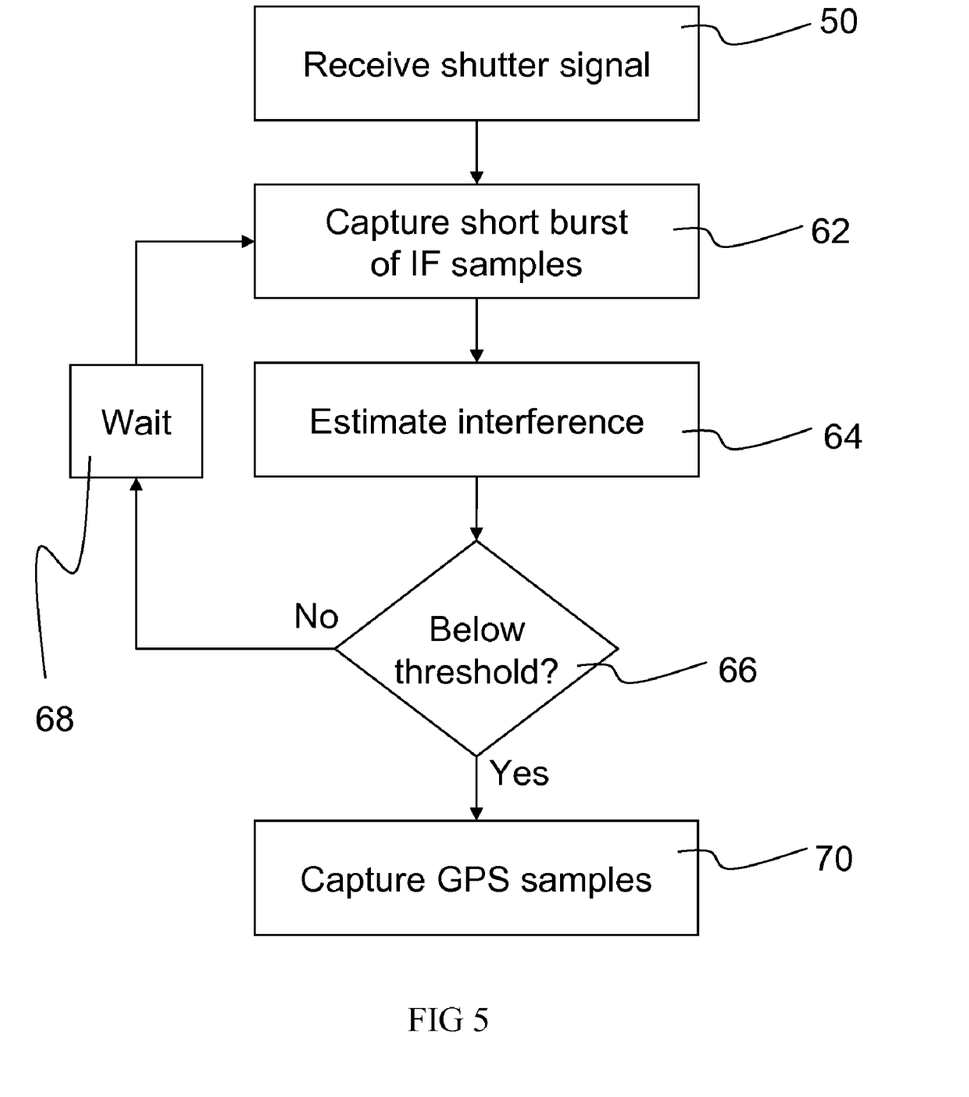
FIG. 5 is a flowchart showing a method of receiving satellite signals according to an embodiment in which the duration of the delay is determined dynamically.

One such embodiment will now be described, by way of example and with reference to FIGS. 5-7.

In this embodiment, upon triggering via the camera hot-shoe in step 50, the GPS radio (also known as the RF front-end) 100,110,120 in the receiver 20 is enabled and starts producing down-converted (IF) signal samples. In step 62, about 1 ms worth of this data is stored in an internal memory 130 of the GPS receiver 20. This data is analysed in step 64, to assess the level of interference. In this example, the 1 ms duration of the initial capture is too short to allow full processing to derive a position fix. Instead, the intention is to quickly obtain an estimate of the interference. In step 66, if the interference is detected to be above an allowed threshold, then the receiver waits (step 68) for a short period, typically of the order of 1-10 ms, and repeats a further initial capture. The process repeats until the interference detected in the samples of the initial capture falls below the threshold. When this happens, it is safe to capture the burst of GPS signal samples to be used in the position calculation. The method therefore proceeds with step 70, as in the previous embodiments.

This approach has the advantages described earlier above, of increased reliability of the resulting "full" GPS capture, from step 70. It is also relatively energy efficient, because the sampling 62 and testing 64 used to detect interference can be kept to a minimum. It is more efficient, for example, than repeatedly capturing "full" 200 ms bursts of GPS data in the hope that at least one will lead to a successful position fix. The efficient use of resources can help to prolong battery life in portable devices.

Note that the method is beneficial for both real-time GPS receivers and capture and process later receivers. In the former case, the computationally intensive step of fully processing the GPS IF signal samples is delayed until there is a good chance that it will succeed. Thus effort and energy are potentially saved. For a capture-and-process system, the benefits are in the increased reliability of the GPS signal samples stored.

A variety of techniques can be used to estimate the level of interference in the 1 ms initial GPS capture, in step 64. One approach is to perform frequency domain analysis—for example, using a Fast Fourier Transform (FFT). An FFT of 256 points would give approximately 20 KHz noise bandwidth per point, assuming a typical sampling rate in the region of 5 MHz. At this sampling rate, the 1 ms capture will comprise approximately 5000 data samples. The 256-point FFT can be repeated across the capture and the results averaged (or simply summed). For example, given 5000 samples a 256-point FFT can be performed on samples 1-256, a second on samples 257-512, a third on samples 513-768, and so on. The results of all these FFTs are summed, providing an average of about 20 values for each bin. It is possible to perform a single FFT on the whole capture (5000 samples); however, the computational complexity of such a large FFT would often be prohibitive.

The maximum amplitude among the FFT points can be taken to indicate the largest interferer. If this amplitude is above a predefined threshold, the interference is deemed too great for a full capture to be reliable. The choice of threshold will depend on the implementation, but will typically depend on such factors as the number of points in the FFT; the number of FFTs averaged; and the characteristics of the RF front-end. The goal of the threshold is to discriminate between normal background noise (low) and the interference produced by the camera electronics (high). Optionally, interference that is well separated from the signal (for example, at least 0.5 MHz away) may be accepted. Thus, it may only be necessary to compute the FFT bins near to the expected GPS signal. As a further alternative, two thresholds could be employed: one for in-band (within 0.5 MHz) interference; and another for out-of-band interference (beyond 0.5 MHz).

Figure 6:
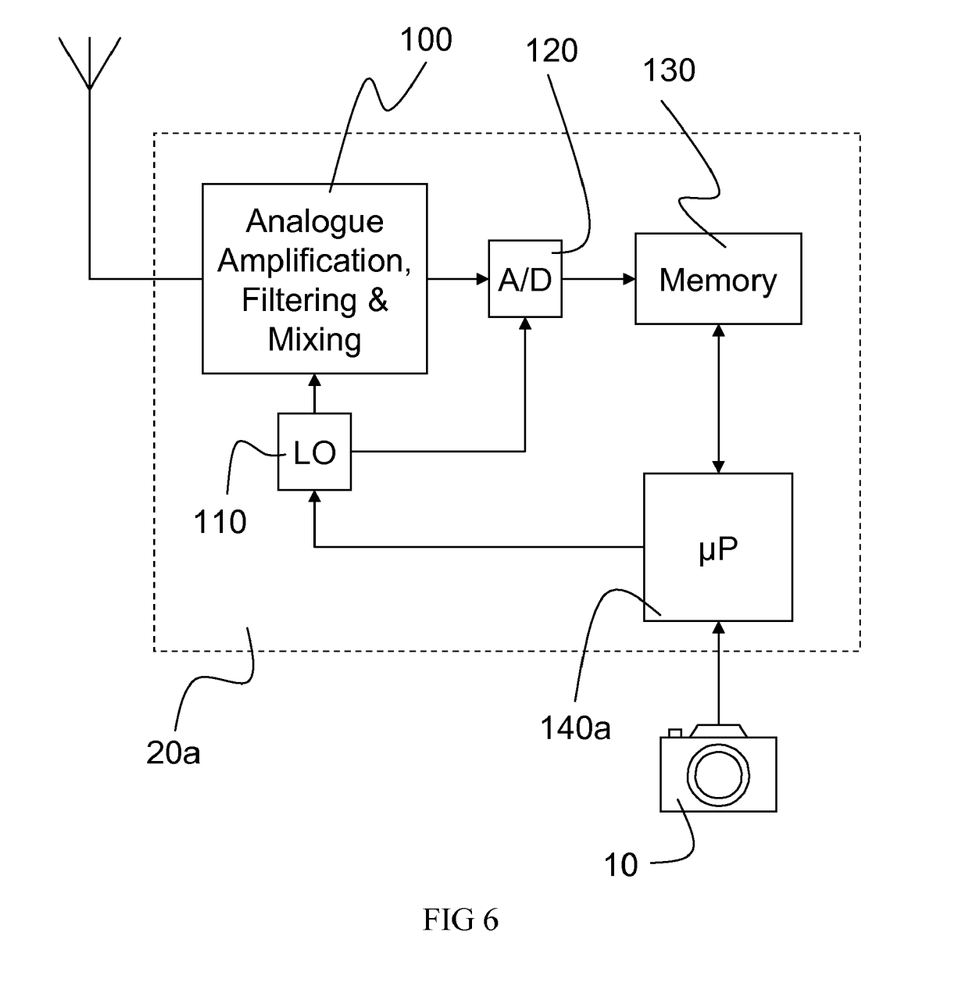
FIG. 6 shows additional detail of the GPS receiver according to one embodiment of the method of FIG. 5.

FIG. 6 illustrates an embodiment of a GPS receiver 20a which estimates interference by means of an FFT. The microprocessor 140a receives the shutter release trigger signal from the camera 10 and, in response, activates the front-end. The front-end comprises an analogue amplification, filtering, and mixing unit 100; a local oscillator (LO) 110 which supplies the signal for down-mixing; and an analogue to digital converter (A/D) 120 which samples the resulting down-mixed IF signal. These are all conventional RF front-end components for standard GPS receivers, as will be well known to those skilled in the art. The IF samples output by the analogue to digital converter (A/D) 120 are stored in the memory 130 as described above. The microprocessor 140a retrieves the samples from memory and performs the FFT. The microprocessor may be a general purpose processor, but is preferably specialised for digital signal processing (DSP) operations. Such chips will typically provide optimised on-board FFT functions. If the microprocessor determines, based on the FFT, that the interference is below the allowed threshold it will control the front-end and memory to store a "full" 200 ms capture. If the interference is above the threshold, the microprocessor will initiate the capture of another short burst of IF data after a suitable pause (as discussed above with reference to steps 66, 68 and 70).

Another way to estimate interference is to mix the received signal samples with signal samples generated by a programmable frequency source.

This frequency source generates a reference signal which is a sinusoid at a centre-frequency of interest. The frequency of interest will correspond to the expected frequency of the satellite signals in the IF data samples. This in turn will depend on the frequency of the local oscillator (LO) that was used in down-mixing the signals. Thus, the frequency of the programmable frequency source will be chosen in conjunction with the LO frequency, such that the generated signal samples correspond in frequency to the expected position of the satellite signals in the spectrum of the IF signal data. In this way, the mixing operation examines the portion of the frequency spectrum centred on the expected location of the satellite signals. The magnitude of the interference can be determined, for example, by simply summing the output of the mixing operation.

This mixing to detect interference at the satellite frequency may advantageously be carried out by the same or similar hardware used to perform the correlation function during carrier and code phase measurement. This is because the generated samples of the reference signal correspond to the signal used for correlation, but without the spreading code of a particular satellite modulated on top of the carrier. Thus, depending on the hardware implementation of a given GPS receiver, it may be possible to simply disable the code mixing part in the correlator to turn it into a device suitable for estimating interference.

Figure 7:
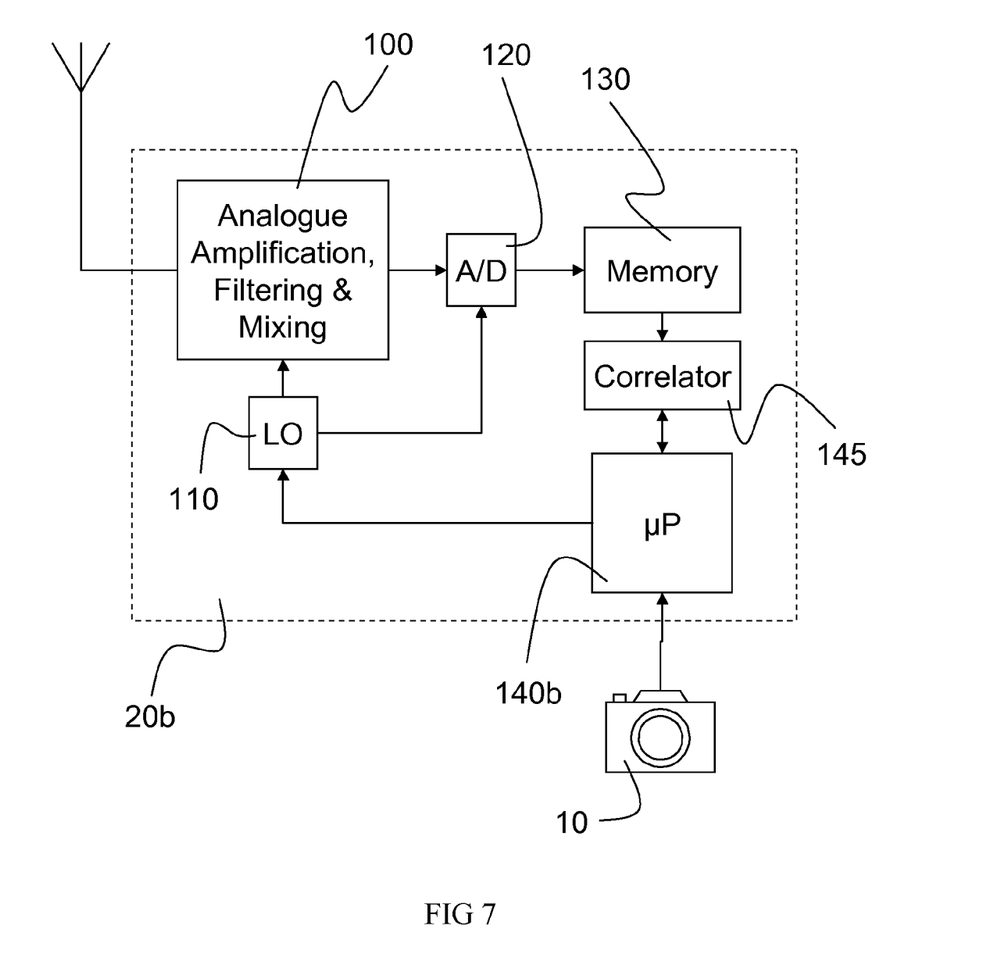
FIG. 7 shows a GPS receiver according to another, related embodiment of the method of FIG. 5.

FIG. 7 illustrates an embodiment of a GPS receiver 20b suitable for implementing this approach. Compared with the receiver 20a of FIG. 6, this receiver has a simpler processor 140b, which is used mainly to control the other hardware components in the device. The estimation of interference 64 is performed by the correlator 145 as described above.

As will be readily apparent to those skilled in the art, it is necessary to search for satellite signals at a range of frequencies, to take account of Doppler effects due to relative motion of the receiver and the different satellites and also to ensure robustness to frequency deviations of practical local oscillators. The same principle applies to the measurement of interference. Therefore, it may be beneficial to test for interference centred at a set of discrete frequencies, corresponding to the frequencies that will be searched for satellite signals. This will comprise mixing with sinusoidal reference signals at each of these discrete frequencies. A single programmable frequency source and mixer (that is, a single correlator) could be used to step though the discrete frequencies of the frequency plan in sequence. This is the case for the embodiment of FIG. 7. Alternatively, multiple different correlators could be used to implement the different tests in parallel for different centre frequencies.

The basic approach of waiting until interference drops below a threshold can optionally be augmented in various ways.

For example, it has been observed that some cameras have permanent interferers present (for example, due to a clock harmonic). Thus, it may be beneficial to set some maximum timeout (for example, 2 seconds) by which time the full capture must be performed. Otherwise, the interference detector may repeat its test indefinitely—never meeting the threshold criterion. In addition as noted previously above, the longer the delay, the greater the chance of the user putting the camera away before the GPS signal burst has been captured.

To save power consumption (and thus increase battery life), it may also be beneficial to set a minimum delay (for example, 1 second), so that the interference testing is first enabled after a 1 second delay. With both of these variations implemented, the "full" capture will happen at some time between 1 and 2 seconds after the shutter, with the precise timing dependent on the detected interference.

In a further variation of this embodiment, the GPS receiver can store a history of interference estimates over time. This can allow the use of previous observations of the interference level to adjust the timing for future captures.

For example, in the embodiments already described, an estimate of interference is generated 64 for each repeated capture 62 of a short burst of IF data samples. Each of these estimates can be stored in the memory 130. If the maximum delay is reached without the last estimate having fallen below the required threshold, then the stored history of estimates can be analysed to adjust the threshold value. This will hopefully ensure that when the next photograph is taken, the timing of the capture 70 of GPS signal samples will be better optimised. In other words, the fact that a timeout has occurred can be taken as an indication that the current setting of the threshold is too low for the current level of interference. By way of example, the new threshold could be set as the average of the estimates observed. More complex analysis could be used to search for a sudden fall in the level of interference. This might include clustering the estimates into two classes ("high" and "low" interference), or analysing the difference between successive estimates and choosing the threshold to correspond to the largest single drop.

By using the history of estimates, the method allows the threshold for one photo to be determined based on a level or levels of interference previously measured after the shutter signal of an earlier photo. In this way, the system can adapt to changes in the interference characteristics over time or in different photographic modes.

Similar principles can equally be used to reduce the threshold if it is too high. For example, if the first estimate of interference is below the threshold, the threshold can be reduced for subsequent photos.

Other thresholds might also be varied similarly. For example, if the first estimate of interference is consistently found to be below the threshold, the minimum delay could be reduced, since it may be causing the system to wait too long after each shutter signal.

In a real-time GPS receiver, it may be possible to adapt the thresholds based on feedback from the position calculation algorithm: if a position fix is possible, this can indicate that the interference level is acceptable. If a position fix failed, this may indicate that the interference was too great. Of course, other factors, such as obscured visibility of satellites will also affect the ability to compute a position fix and these should also be taken into account.

Even in a capture and process receiver, a similar feedback mechanism can be implemented if the interference estimation process is also applied to the full (200 ms) capture of GPS signal samples. This estimation may be performed on-board the GPS receiver, or later, when the stored samples are transferred to another device for further processing. In either case, such feedback may help to identify interferers that become active later in time after the shutter signal. Late interferers might include hardware events such as reactivation of the camera display screen after a photograph has been taken and the image data has been written to the camera memory.

For longer term analysis, the delay actually employed and/or the associated thresholds could be recorded with the captured GPS signal samples (the "full" capture). This may facilitate convergence to a robust average set of parameters for the method, over time.

As will be apparent from the foregoing description, the current invention is equally applicable to real-time conventional GPS systems and to capture-and-process systems. It should also be noted that the invention is not limited to GPS satellite positioning, but may be applied to any other global navigation satellite system (GNSS), including, for example, GLONASS and Galileo.

References to "intermediate frequency" signals are not intended to exclude the possibility of a direct conversion satellite-positioning receiver, which is simply regarded as having an intermediate frequency of zero (or approximately zero). Thus, "intermediate frequency" signal refers to a signal down-mixed from the satellite frequency to some lower frequency, which may result directly in recovery of the baseband spreading code. "Intermediate frequency" is therefore a generic term for the signal input to the correlation calculation in order to perform the carrier- and code-phase measurements necessary to derive pseudo-ranges.

Various other modifications will be apparent to those skilled in the art.

The invention claimed is:

1. A method of receiving satellite signals for estimating the location of capture of a first photograph by a camera, the method comprising:

receiving a signal relating to the timing of capture of the first photograph;

upon receipt of the signal, waiting for an interval of non-zero duration, wherein the duration of the interval comprises at least one of a predetermined delay and a delay based upon measured electromagnetic interference detected after the capture of the first photograph; and commencing receiving the satellite signals upon completion of the interval.

2. The method of claim 1, wherein the duration is manually adjustable.

3. The method of claim 1, wherein the duration is determined based upon parameters of the camera, preferably automatically.

4. The method of claim 1, wherein the step of measuring the electromagnetic interference comprises at least one of:

performing a Fourier transform on a sequence of received IF signal samples; and mixing a sequence of received IF signal samples with generated signal samples at a frequency of interest.

5. The method of claim 1, wherein the duration of the interval is determined by repeatedly or continuously measuring the level of interference, wherein the interval ends as soon as the measured level of interference falls below a threshold.

6. The method of claim 1, further comprising repeating the step of receiving the satellite signals a predetermined number of times.

7. The method of claim 1, further comprising:

during the interval, receiving a further signal relating to the timing of the capture of an additional photograph; and in response, adjusting the duration of the interval.

8. The method of claim 1, further comprising storing the received satellite signals in a memory so as to enable later processing to estimate the location of capture.

9. Satellite signal receiver apparatus comprising:

an input, for receiving a signal relating to the timing of capture of a photograph;

a receiver, for receiving satellite signals; and a processor, adapted to control the apparatus to perform a method according to claim 1.

10. A non-transitory computer readable medium having stored thereupon a program for a computer comprising computer program code means adapted to control the computer to perform all the steps of claim 1 if said program is run on the computer.

11. The method of claim 5, wherein the threshold is chosen based on a previously measured level of interference corresponding to the capture of at least one earlier photograph.

12. The method of claim 7, wherein the adjustment of the duration comprises extending the duration of the interval by a predetermined amount.

13. A method of configuring a satellite signal receiver apparatus comprising:

receiving parameters of a camera with which the receiver apparatus is associated;

automatically determining based upon the received parameters the duration of a period of electromagnetic interference associated with capture of a photograph by the camera; and transmitting the determined duration to the receiver apparatus.

14. A non-transitory computer readable medium having stored thereupon a program for a computer comprising computer program code means adapted to control the computer to perform all the steps of claim 13 if said program is run on the computer.

* * * * *

UNITED STATES PATENT AND TRADEMARK OFFICE
CERTIFICATE OF CORRECTION

| | | |
|---|---|---|
| PATENT NO. | : 8,346,075 B2 | Page 1 of 1 |
| APPLICATION NO. | : 13/056110 | |
| DATED | : January 1, 2013 | |
| INVENTOR(S) | : John Bowern et al. | |

It is certified that error appears in the above-identified patent and that said Letters Patent is hereby corrected as shown below:

On the Title Page, Under References Cited, please add two foreign references: --EP 1 411 721 A1 published 4/2004 Miyake-- and --WO 2007/034419 A2 published 9/2006 Marshall, et al.--

Signed and Sealed this
Eighteenth Day of June, 2013

Teresa Stanek Rea
*Acting Director of the United States Patent and Trademark Office*